US010557705B2

(12) United States Patent
Kadambi et al.

(10) Patent No.: US 10,557,705 B2
(45) Date of Patent: *Feb. 11, 2020

(54) METHODS AND APPARATUS FOR ENHANCING DEPTH MAPS WITH POLARIZATION CUES

(71) Applicant: Massachusetts Institute of Technology, Cambridge, MA (US)

(72) Inventors: Achuta Kadambi, Los Angeles, CA (US); Vage Taamazyan, Moscow (RU); Boxin Shi, Beijing (CN); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,769

(22) Filed: Feb. 19, 2019

(65) Prior Publication Data

US 2019/0186901 A1    Jun. 20, 2019

Related U.S. Application Data

(63) Continuation of application No. 14/979,433, filed on Dec. 27, 2015, now Pat. No. 10,260,866.
(Continued)

(51) Int. Cl.
*G01B 11/24* (2006.01)
*G06T 7/507* (2017.01)
*G06T 7/514* (2017.01)

(52) U.S. Cl.
CPC ............. *G01B 11/24* (2013.01); *G06T 7/507* (2017.01); *G06T 7/514* (2017.01); *G06T 2207/10028* (2013.01); *G06T 2207/10141* (2013.01)

(58) Field of Classification Search
CPC .......... G01B 11/24; G06T 2207/10028; G06T 2207/10141; G06T 7/507; G06T 7/514
See application file for complete search history.

(56) References Cited

U.S. PATENT DOCUMENTS 8,320,661 B2    11/2012    Barbour
8,736,670 B2     5/2014    Barbour
(Continued)

OTHER PUBLICATIONS

Agrawal, A., et al., What Is the Range of Surface Reconstructions from a Gradient Field? ; published in Computer Vision—ECCV 2006, vol. 3951 of the series Lecture Notes in Computer Science pp. 578-591, Springer Berlin Heidelberg, 2006.
(Continued)

*Primary Examiner* — Farzana Hossain
(74) *Attorney, Agent, or Firm* — Stephen R. Otis

(57) ABSTRACT

A 3D imaging system uses a depth sensor to produce a coarse depth map, and then uses the coarse depth map as a constraint in order to correct ambiguous surface normals computed from polarization cues. The imaging system outputs an enhanced depth map that has a greater depth resolution than the coarse depth map. The enhanced depth map is also much more accurate than could be obtained from the depth sensor alone. In many cases, the imaging system extracts the polarization cues from three polarized images. Thus, in many implementations, the system takes only three extra images—in addition to data used to generate the coarse depth map—in order to dramatically enhance the coarse depth map.

20 Claims, 10 Drawing Sheets

Related U.S. Application Data

(60) Provisional application No. 62/129,033, filed on Mar. 6, 2015.

(56) References Cited

U.S. PATENT DOCUMENTS

| | | | |
|---|---|---|---|
| 10,260,866 B2* | 4/2019 | Kadambi | G01B 11/24 |
| 2012/0313937 A1* | 12/2012 | Beeler | G06T 19/00 |
| | | | 345/419 |
| 2016/0261852 A1 | 9/2016 | Hirasawa | |

OTHER PUBLICATIONS

D'Angelo, P., et al., Image-based 3D surface reconstruction by combination of photometric, geometric, and real-aperture methods; published in ISPRS Journal of Photogrammetry and Remote Sensing, vol. 63, Issue 3, p. 297-321, Elsevier, 2007.

D'Angelo, P., 3D scene reconstruction by integration of photometric and geometric methods; Thesis, Bielefeld University; 2007.

Atkinson, G., et al., Multi-view surface reconstruction using polarization; published in Tenth IEEE International Conference on Computer Vision, 2005, ICCV 2005, vol. 1, pp. 309-316; IEEE 2005.

Atkinson, G., et al., Recovery of surface orientation from diffuse polarization; published in IEEE Transactions on Image Processing, vol. 15, Issue 6, pp. 1653-1664, IEEE, Jun. 2006.

Atkinson, G., et al., Surface Reconstruction Using Polarization and Photometric Stereo; published in Computer Analysis of Images and Patterns, vol. 4673 of the series Lecture Notes in Computer Science, pp. 466-473, Springer Berlin Heidelberg, 2007.

Atkinson, G., et al., Shape Estimation Using Polarization and Shading from Two Views; published in IEEE Transactions on Pattern Analysis and Machine Intelligence, vol. 29, Issue 11, pp. 2001-2017, IEEE 2007.

Bove, V., Probabilistic method for integrating multiple sources of range data; published in Journal of the Optical Society of America A, vol. 7, Issue 12, pp. 2193-2198, Optical Society of America, 1990.

Then, T., et al., Polarization and Phase-Shifting for 3D Scanning of Translucent Objects; published in IEEE Conference on Computer Vision and Pattern Recognition, 2007, CVPR '07, pp. 1-8, IEEE 2007.

Guarnera, G., et al., Estimating Surface Normals from Spherical Stokes Reflectance Fields; published in Computer Vision—ECCV 2012, Workshops and Demonstrations, vol. 7584 of the series Lecture Notes in Computer Science pp. 340-349, Springer Berlin Heidelberg, 2012.

Hernandez, C., et al., Multiview Photometric Stereo; published in IEEE Transactions on Pattern Analysis and Machine Intelligence, vol. 30, Issue 3, pp. 548-554, IEEE 2008.

Joshi, N., et al., Shape from Varying Illumination and Viewpoint; ICCV 2007.

Ma, W., et al., Rapid acquisition of specular and diffuse normal maps from polarized spherical gradient illumination; published in EGSR'07 Proceedings of the 18th Eurographics conference on Rendering Techniques, pp. 183-194, Eurographics Association, Aire-la-Ville, Switzerland, Switzerland, 2007.

Miyazaki, D., et al., Polarization-based Inverse Rendering from a Single View; published in Proceedings of Ninth IEEE International Conference on Computer Vision, 2003, vol. 2, pp. 982-987, IEEE 2003.

Nehab, D., et al., Efficiently combining positions and normals for precise 3D geometry; published in ACM Transactions on Graphics (TOG), Proceedings of ACM SIGGRAPH 2005 TOG, vol. 24, Issue 3, Jul. 2005, pp. 536-543, ACM New York, NY, USA.

Zhang, Z., Flexible Camera Calibration by Viewing a Plane From Unknown Orientations; published in Proceedings of the Seventh IEEE International Conference on Computer Vision, 1999, vol. 1, pp. 666-673, IEEE 1999.

Zhang R., Shape-from-shading: a survey; published in IEEE Transactions on Pattern Analysis and Machine Intelligence, vol. 21, Issue 8, pp. 690-706, IEEE 1999.

\* cited by examiner

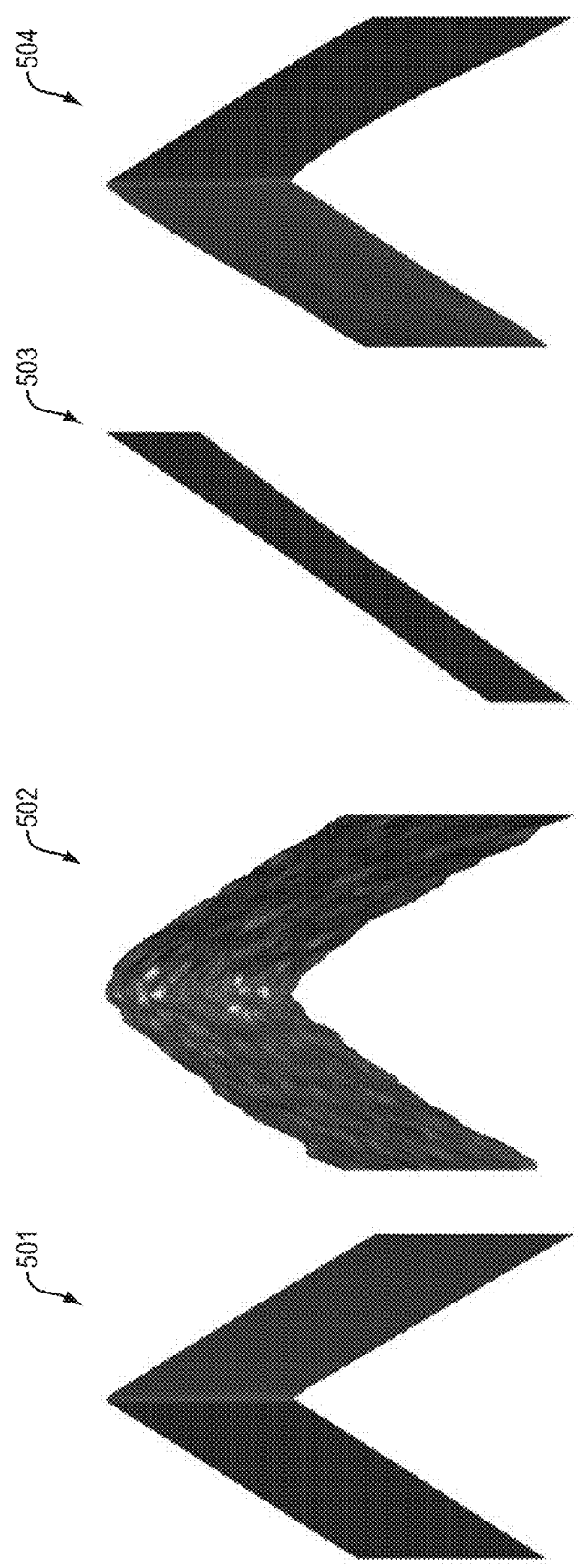

METHODS AND APPARATUS FOR ENHANCING DEPTH MAPS WITH POLARIZATION CUES

RELATED APPLICATIONS

This application is a continuation of U.S. application Ser. No. 14/979,433 filed on Dec. 27, 2015, which claims the benefit of U.S. Provisional Application No. 62/129,033, filed Mar. 6, 2015 (the "Provisional application"). The entire disclosure of the Provisional application is incorporated herein by reference.

STATEMENT REGARDING FEDERALLY SPONSORED RESEARCH OR DEVELOPMENT

This invention was made with Government support under Contract No. N00030-13-C-0005 awarded by the U.S. Navy. The Government has certain rights in the invention.

FIELD OF TECHNOLOGY

The present invention relates generally to 3D imaging.

BACKGROUND

The shape of an object causes small changes in the polarization of light that reflects from the object. This effect may be observed by rotating a polarizing filter in front of a digital camera.

SUMMARY

In illustrative implementations of this invention, a 3D imaging system (a) uses a depth sensor (such as Kinect®) to produce a coarse depth map, and (b) then uses the coarse depth map as a constraint in order to correct ambiguous surface normals computed from polarization cues. The imaging system outputs an enhanced depth map that has a greater depth resolution than the coarse depth map. The enhanced depth map is also much more accurate than could be obtained from the depth sensor alone.

In many cases, the imaging system extracts the polarization cues from three polarized images. Thus, in many implementations, the system takes only three extra images (in addition to data used to generate the coarse depth map) in order to dramatically enhance the coarse depth map.

In some implementations of this invention, the 3D imaging system includes two cameras: (a) a depth sensor (such as a Microsoft Kinect®) and (b) a digital camera with a polarizer filter. The digital camera captures images of a scene at multiple polarization angles. Polarization cues from these images are used to calculate surface normals and a gradient map of the scene. The depth sensor produces a coarse depth map. Reliable portions of the coarse depth map are used as a constraint to correct the gradient map obtained from polarization cues. The imaging system outputs an enhanced depth map.

Alternatively, in some implementations of this invention, the number of cameras in the 3D imaging system is only one. In that case, the single camera captures both the images from which the coarse depth map is extracted and the polarized images from which polarization cues are extracted. For example, in some cases, this single camera is housed in a handheld device, such as a smartphone, a game controller, a tablet computer or a consumer camera product. In some cases, a single camera employs structured illumination in order to acquire the coarse depth map. In some other cases, a single polarized camera employs focus cues to capture both depth and polarization information. In some other cases, a single polarized camera is moved around the scene to capture depth (e.g., Structure from Motion) and polarization information.

In exemplary implementations of this invention, the imaging system overcomes systemic errors that plague conventional shape-from-polarization ("SfP") techniques. In conventional SfP methods, surface normals are drastically distorted, due to the following five errors:

First, the azimuth component of the surface normal contains an ambiguity of $\pi$ radians, which leads to ambiguous flips in the 3D shape.

Second, the surface normal may suffer from refractive distortion. In conventional SfP, obtaining the zenith component of the surface normal requires knowledge of the refractive index to estimate accurate 3D shape.

Third, when the zenith angle of the surface normal is close to zero, the obtained normals are noisy. The zenith angle is close to zero at fronto-parallel surfaces of the scene.

Fourth: depth discontinuities may make it difficult to accurately recover the 3D shape.

Fifth, integration of surface normals obtains only relative 3D shape, subject to possible offset and scaling.

In illustrative implementations of this paper, each of these five problems is reduced or eliminated by using a coarse depth map as a constraint to correct ambiguous surface normals obtained from polarization cues. Specifically, the first problem is solved by using the coarse depth map to resolve the azimuthal ambiguity in the gradient map obtained from polarization cues. Similarly, the second problem is solved by using the coarse depth map to correct for refractive distortion. The third problem (where zenith angle approaches zero at fronto-parallel surfaces) is resolved by a spanning tree integration scheme that uses the degree of polarization as a weighting parameter. The fourth and fifth problems are solved by fusing (i) depth data and (ii) surface normals computed from polarization cues ("polarization normals").

In some implementations, the imaging system does not require active lighting, but instead extracts polarization cues from images captured under passive, unpolarized illumination.

Furthermore, in illustrative implementations, the 3D imaging system performs robustly in the presence of diffuse reflections and specular reflections from the scene. Thus, the imaging system handles a wide range of material properties of objects in the scene. For example, the imaging system extracts polarization cues from diffuse reflections (e.g., reflections from dielectric surfaces) and from specular reflections (e.g., from non-dielectric surfaces).

This invention has many practical applications. Among other things, in illustrative implementations, this invention may be used in any application that would benefit from high-precision 3D imaging, including (a) surgery; (b) 3D scanning for 3D printing; (c) facial capture, including capturing 3D data for recognizing emotions and facial gestures; and (d) hand and finger tracking, such for a human/computer interface.

The advantages of this invention are apparent, when compared with existing technology.

Existing art has fused coarse depth maps and surface normals in order to achieve an enhanced depth map. However, this existing art conventionally uses surface normals obtained by photometric stereo (PS) or from shape-from-shading (SfS) techniques.

Apparently, no one else has fused a coarse depth map and surface normals from polarization cues in order to produce an enhanced depth map, as is done in illustrative implementations of this invention. Perhaps the five systemic errors of shape-from-polarization (SfP) identified above discouraged others from doing so. However, in illustrative implementations of this invention, these five systemic errors of SfP are reduced or eliminated, thereby making it feasible to fuse a coarse depth map and polarization normal in order to achieve an enhanced depth map.

The present invention employs surface normals from polarization cues (polarization normals). Obtaining surface normals through polarization has at least four advantages over many conventional shape-from shading (SfS) and conventional photometric stereo (PS) techniques:

First, in illustrative implementations of this invention, polarization normals are extracted from images acquired under passive illumination. If light incident on an object is unpolarized, the surface normals may be obtained by rotating a polarizer at the imaging sensor.

Second, in illustrative implementations of this invention, the imaging system is robust to diffuse interreflections. Unlike SfS and PS, diffuse interreflections do not significantly corrupt the estimated shape.

Third, in illustrative implementations of this invention, the imaging accurately measures 3D shape over a wide range of material properties in a scene. For example, the imaging system accurately measures 3D shapes of objects comprising dielectrics, metals or translucent materials.

Fourth, in illustrative implementations of this invention, the imaging system handles a wide range of lighting conditions. For example, if incident light is unpolarized, the shape estimation is robust and may be conducted indoors, outdoors, or under patterned illumination.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 4A shows a coarse depth map of a Styrofoam® cup. FIG. 4B shows images captured at different angles of a polarization filter. FIG. 4C shows a depth map computed from polarization cues. FIG. 4D shows a depth map from which azimuthal ambiguity has been removed. FIG. 4E shows an enhanced depth map that is produced by using a coarse depth map as a constraint to correct ambiguities in polarization normals.

FIGS. 5A-5D illustrate depth maps of a corner in a scene. FIG. 5A shows the actual "ground truth" shape of a corner. FIG. 5B shows a coarse depth map produced by Kinect®. FIG. 5C shows a depth map calculated from polarization normals. FIG. 5D shows an enhanced depth map produced by using a coarse depth map to correct ambiguities in polarization normals.

The above Figures show some illustrative implementations of this invention, or provide information that relates to those implementations. However, this invention may be implemented in many other ways.

DETAILED DESCRIPTION

In illustrative implementations of this invention, a 3D imaging system merges coarse depth maps with ambiguous surface normals from polarization cues.

In illustrative implementations of this invention: (a) coarse depth maps are enhanced by using the shape information from polarization cues; and (b) a 3D imaging system uses an aligned coarse depth map as a constraint to correct surface normals from polarization (hereafter polarization normals).

In some implementations of this invention, laser scanner quality of 3D shape acquisition is achieved by taking into account both a coarse depth map and polarization cues. For example, in some implementations, a coarse depth map produced by Kinect® depth sensor and polarization cues extracted from three polarized photographs are used to reconstruct a 3D surface. Subtle changes between the polarization images provides information about surface orientation.

In illustrative implementations of this invention, one or more cameras spatially divide regions of ambiguous polarization normals into low and high frequency bands. Low frequency ambiguity is corrected using depth information from the coarse depth map and high frequency ambiguity is corrected using a prior on closed surfaces.

In some implementations, the 3D imaging system includes two cameras: (a) a depth camera that acquires the coarse depth map; and (b) a digital camera with attached polarizer that acquires polarized images from which polarization cues are extracted.

Figure 1A:
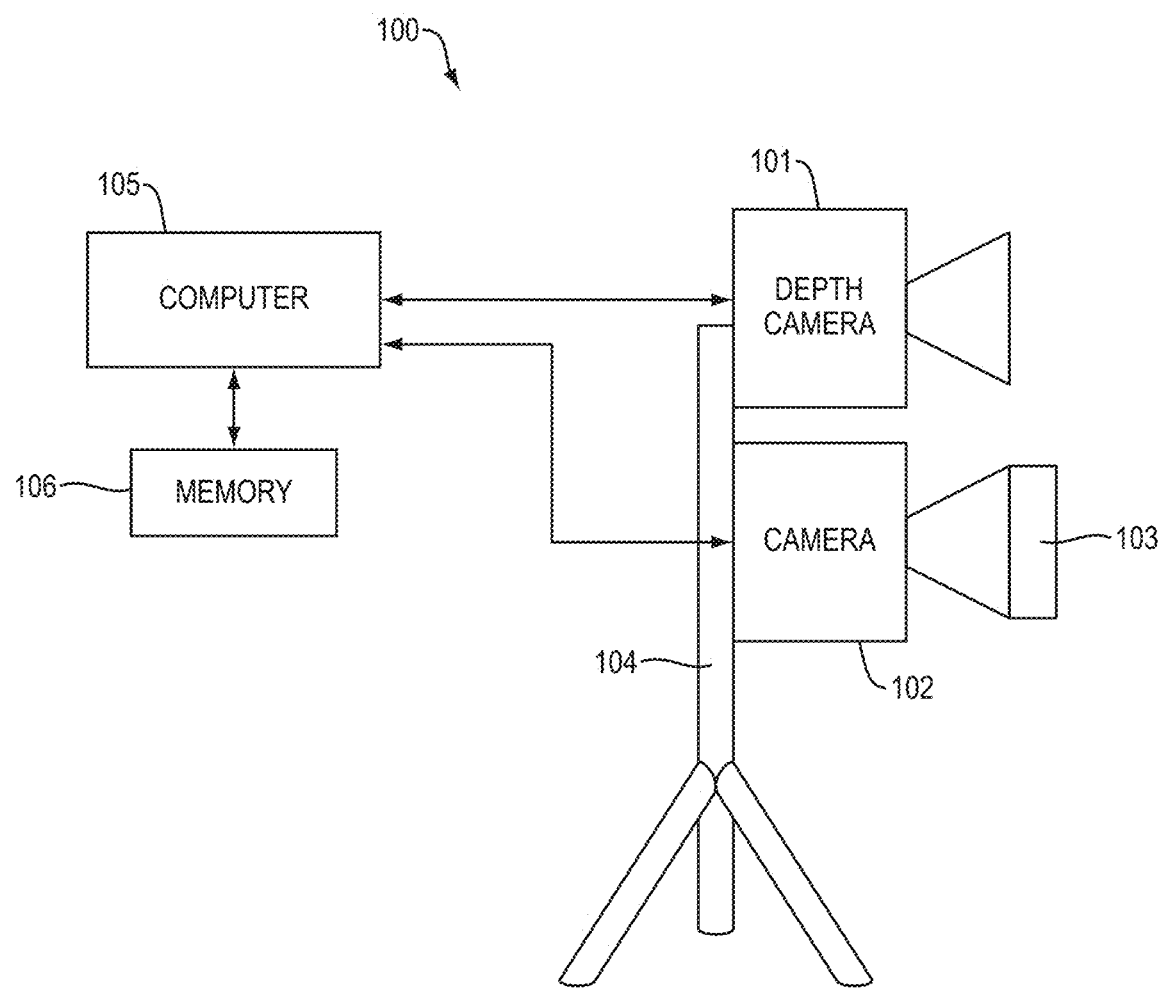
FIG. 1A shows hardware components of a 3D imaging system that includes two cameras.

FIG. 1A shows hardware components of a 3D imaging system that includes two cameras. In the example shown in FIG. 1A, a 3D imaging system 100 comprises a depth camera 101, a digital camera 102, a polarizer filter 103, a structural element 104, a computer 105 and a memory device 106. The structural element 104 supports the two cameras 101, 102 and keeps the two cameras at a fixed position relative to each other. In FIG. 1A, depth camera 101 acquires a coarse depth map, and digital camera 102 acquires polarized images from which polarization cues are extracted.

In some other implementations, the 3D imaging system has a single camera. That is, there is one (and only one) camera in the 3D imaging system.

Figure 1B:
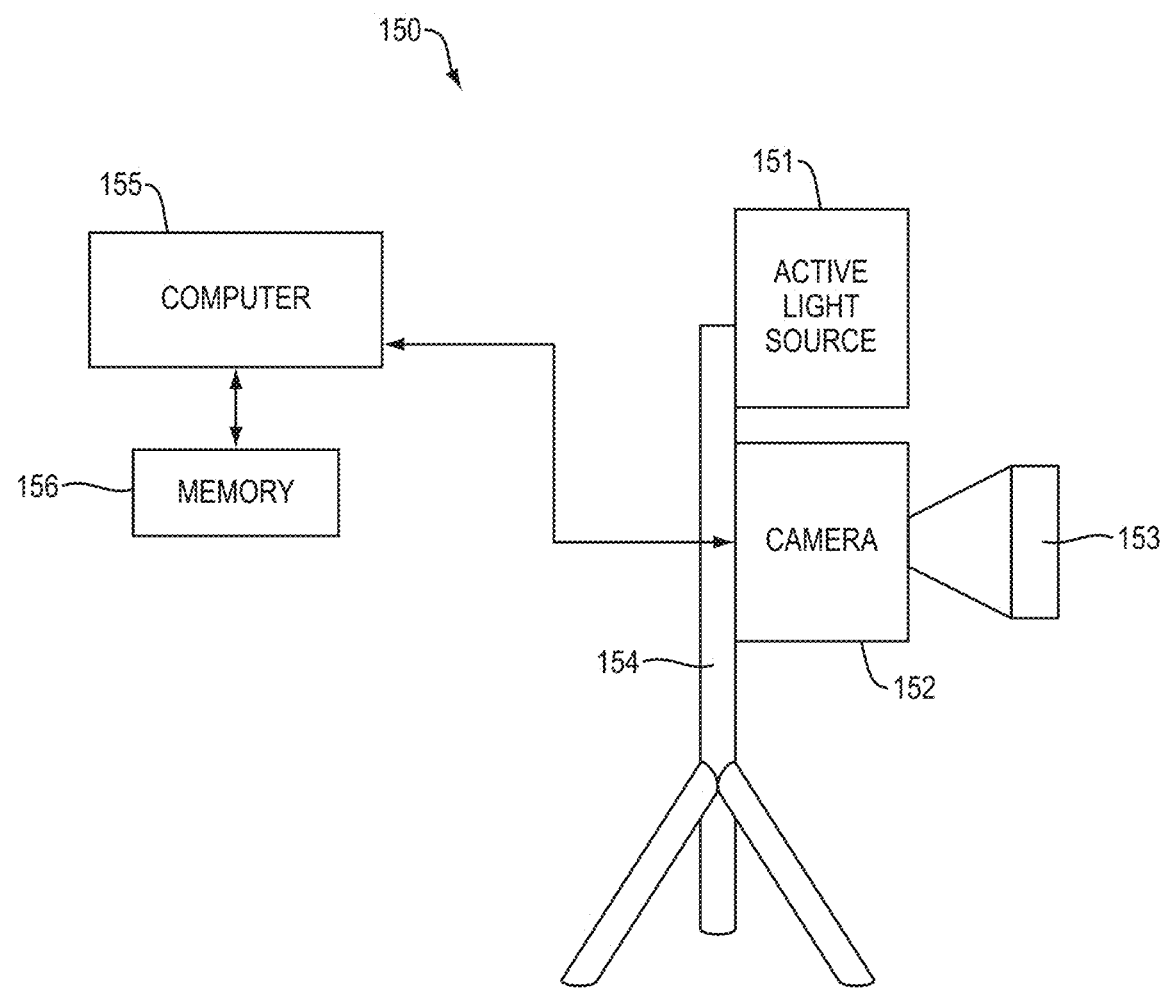
FIG. 1B shows hardware components of a 3D imaging system that has only one camera.

FIG. 1B shows hardware components of a 3D imaging system that has only one camera. In the example shown in FIG. 1B, a 3D imaging system 150 comprises a single camera 152, an active light source 151, a polarizer filter 153, a support element 154, a computer 155 and a memory device 156. The single camera 152 captures both the images from which the coarse depth map is extracted and the polarized images from which polarization cues are extracted. The support element 154 supports the single camera 152.

In some cases: (a) the single camera 152 captures images of the scene while active light source 151 emits structured lighting that illuminates the scene; and (b) these images of the scene under structured lighting are analyzed in order to calculate the coarse depth map.

Alternatively, in some cases, the 3D imaging system includes multiple camera units, each of which image a scene from a different angle (viewpoint). The multiple camera units, each of which view the scene from a different angle, may either (a) comprise structures that are separate from each other and not part of a single structure; or (b) be housed together in a single structure such as a multi-aperture camera.

Figure 1C:
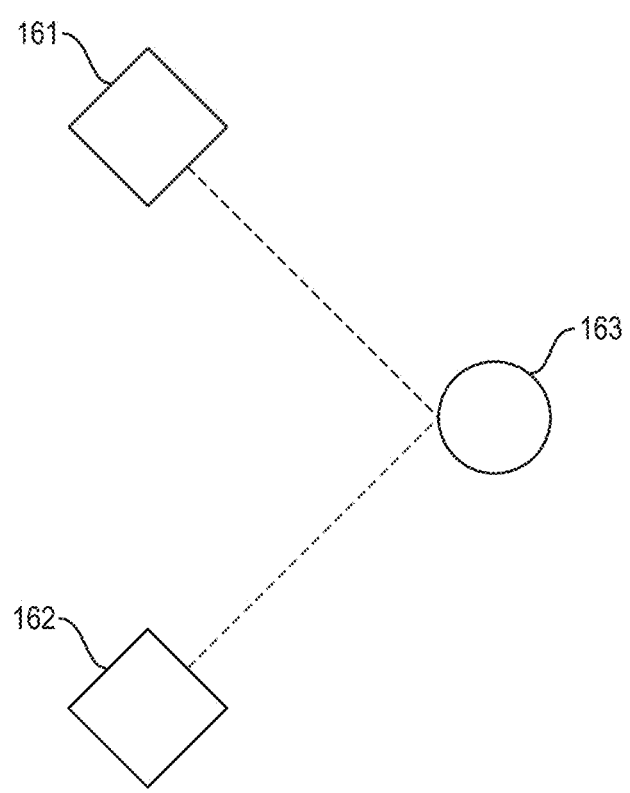
FIG. 1C shows a multi-view configuration of a 3D imaging system.

FIG. 1C shows a multi-view configuration of a 3D imaging system. In the example shown in FIG. 1C, camera unit 161 and camera unit 162 are positioned such that they view an object 163 in the scene from different angles. Each camera unit in FIG. 1C (e.g., 161 or 162) may itself comprise a single camera (such as camera 150 in FIG. 1B) or a two-camera system (such as system 100 in FIG. 1A). In some cases, the multiple camera units (e.g., 161, 162) are separate structures. In other cases, the multiple camera units (e.g., 161, 162) are housed together in a single structure comprising a multi-aperture camera.

An advantage of a multi-view configuration is that it solves a problem associated with fronto-parallel surfaces. This problem is that surface normals extracted from polarization cues in polarized images are noisy and unreliable if the surface is fronto-parallel to the camera capturing the polarized image. (This problem is discussed in more detail below). In a multi-view configuration, the different camera units (e.g., 161, 162) image the scene from different vantage points such that a given surface in the scene cannot be simultaneously fronto-parallel to both camera units at the same time. (A surface is fronto-parallel to a camera if the surface and the image plane of the camera are parallel or within five degrees of parallel.)

In illustrative implementations, polarization normals are computed based on monochrome, polarized images. For example, in some cases, the digital camera that captures the polarized images (e.g., camera 102 or 152) comprises a digital grayscale camera. Alternatively, the digital camera that captures the polarized images is a single color channel of a digital color camera. Or, in some cases, an RBG image captured by a digital camera is converted to grayscale. In a prototype of this invention, the digital camera that captures polarized images comprises a Canon® Rebel T3i DSLR camera with a standard Canon® EF-S 18-55 mm f/3.5-5.6 IS II SLR lens, and a linear polarizer with quarter-wave plate, model Hoya® CIR-PL. The RBG image produced by the Canon® Rebel T3i is converted to grayscale.

The polarized images outputted by the digital camera (e.g., 102 or 152) are linear images, such that the value at each pixel is directly related to the number of photons received at that location on the sensor. A linear image is desirable, in order to be able to extract polarization cues from the polarized images captured by the digital camera 102. In a prototype of this invention, a draw tool converts data from a Canon® Rebel T3i camera into a linear image. If a JPEG or other non-linear image is used, then the surface normals from polarization will not be mapped correctly.

In illustrative implementations, the digital camera (e.g., 102, 152) that captures polarized images captures three different images of a scene, each at a different polarizer angle of a polarizer filter (e.g., 103, 153).

In some cases, the three images at different polarizer angles are taken during a single exposure. For example, in some cases, the polarizer filter (e.g., 103, 153) comprises a Moxtek® pixelated polarizer that employs Proflux Microwire™ technology to capture, during a single exposure, three different images at different polarizer angles instead of RBG (red blue green).

Alternatively, the three different images are taken one after another in temporal sequence, rotating the polarizer filter (e.g., 103, 153) to a different rotation after each exposure. For example, in a prototype of this invention, a Hoya® CIR-PL polarizer is employed. Three images are taken at different rotations of the polarizer. Any three rotations are sufficient, so long as the angles are known. To avoid camera shake when performing the rotation, the Hoya® polarizer is mounted on a protractor placed slightly in front of the lens instead of affixing it directly to the DSLR. Calibration is performed on the polarizer's transmission axis.

Best results are obtained when the lighting is unpolarized. If the 3D imaging system is taken outdoors on a bright, sunny day, artifacts may be observed. However, these artifacts may be calibrated out, by using polarimetry or active illumination.

In illustrative implementations, a camera (e.g., 101 or 152) capture images from which a coarse depth map is extracted ("depth images"). For example, in some cases, the camera that captures the depth images comprises a Kinect® version 1 (Primesense®) or Kinect® version 2 (Canesta® time of flight). Alternatively, the camera that captures the depth images may comprise a laser scanner that performs a 3D laser scan.

In illustrative implementations of this invention, a wide variety of approaches may be used for capturing a coarse depth map. For example, in some cases, one or more cameras estimate time delay using time-of-flight (objects further away create greater optical delays), or exploit parallax/triangulation (objects closer exhibit greater pixel shift from two images at different viewpoints). Triangulation may be either passive (e.g., stereo camera) or active (e.g., using structured light or active stereo). Alternatively, a depth sensor may measure depth from focus/defocus, may measure depth from motion, or may use machine learning methods to approximate 3D depth using the inverse square law. For example, if triangulation is used to acquire a coarse depth map, the data needed for triangulation may be acquired by a stereo pair of cameras. For example, in FIG. 1C, the stereo cameras may comprise a first camera housed in camera unit 161 and a second camera housed in camera unit 162. As another example, if focus cues are used, the data needed for the proposed method can be acquired from a single, fixed camera with adjustable focus and a polarizing filter.

As noted above, in some cases, the 3D imaging system includes both a depth sensor and a separate camera for capturing polarized images. In that case, registration is performed. For example, in some cases: (a) the 3D imaging system includes a depth camera (e.g., 101) and a separate camera (e.g., 102) for capturing polarized images; and (b) a normal map from polarization cues and a course depth map from the depth sensor are registered (i.e., aligned) using intrinsic parameters of the depth camera and relative pose (translation only) of the two cameras. The coarse depth map from the depth camera 101 may be aligned with the polarized images from the digital camera 102 and depth may be obtained in real-world coordinates (mm). In some cases, it is sufficient in practice to crop an object from both the polarized images and the depth data without first aligning the images.

In a prototype of this invention (in which both a depth sensor and a separate camera are employed), grayscale and depth images are aligned as follows: First, the two cameras (gray and depth) are fixed rigidly. Then, multiple photos are captured of a checkerboard. Based on how the checkerboard distorts the image, the intrinsic and extrinsic parameters of each camera are calibrated using standard calibration technique. The relative pose is computed based on the difference between the camera matrices.

As noted above, the depth sensor may comprise a 3D laser scanner. In some implementations of this invention, adding a polarizer to a medium-quality laser scanner is a low-cost solution to computationally replicate the performance of a higher-quality laser scanner.

Surface Normals from Polarization Cues

In illustrative implementations, a computer processes three or more polarized images that are captured by the digital camera 102 at different polarizer angles, in order to calculate surface normals from polarization cues.

Figure 2:
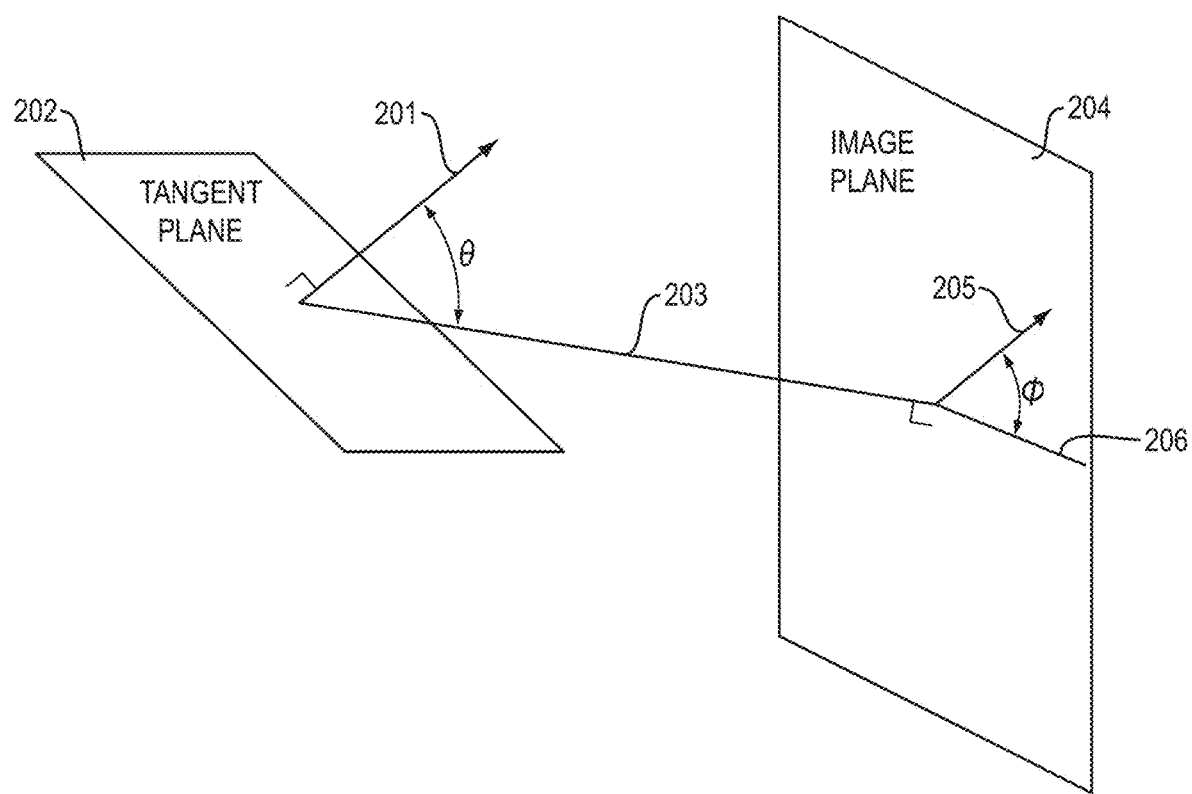
FIG. 2 shows an azimuth angle and a zenith angle of a polarization normal.

FIG. 2 shows an azimuth angle and a zenith angle of a polarization normal (that is, a surface normal computed from polarization cues). In the example shown in FIG. 2, the surface normal 201 is normal to the tangent plane 202 to the surface at a point on the surface. A line 203 is normal to the image plane 204 of the digital camera 102. The image plane 204 is located in the plane of an image sensor in the digital camera 102. The zenith angle θ is the angle between the surface normal 201 and line 203. Line 205 is the orthogonal projection of the surface normal 201 onto the image plane 204. The azimuth angle φ is the angle between line 205 and a reference direction 206. For example, the reference direction 206 may comprise the y-axis of the image plane 204. (In FIG. 2, the azimuth angle φ is shown as π. Of course, φ and π are alternate ways of writing the lower case Greek letter phi).

Figure 3A:
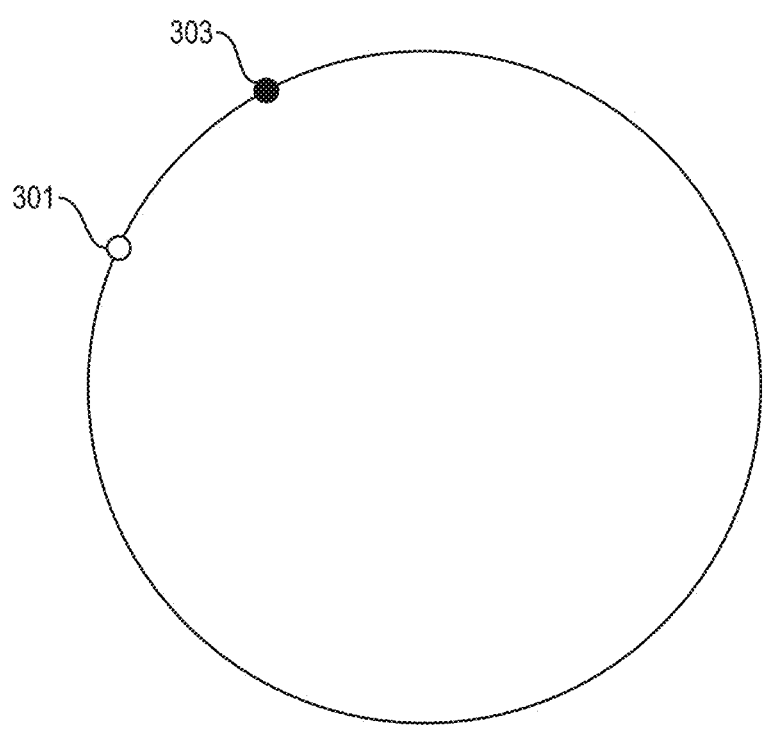
FIG. 3A shows two pixels that correspond to two points on an object in a scene.
Figure 3B:
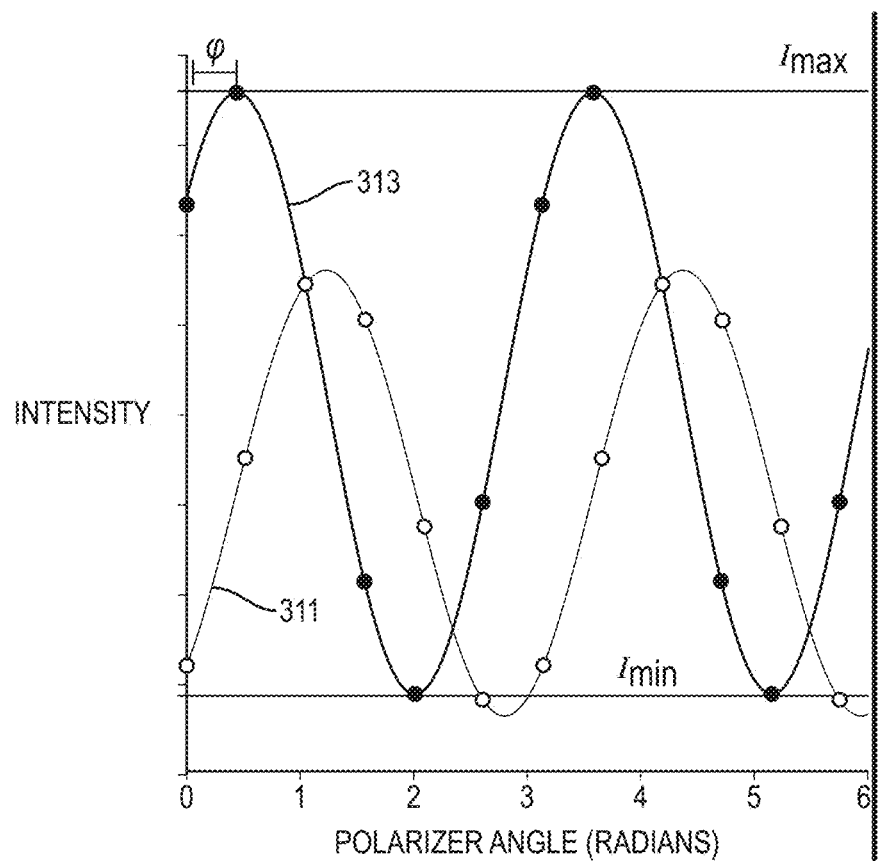
FIG. 3B shows a plot of (a) intensity of each of the two pixels, respectively, versus (b) angle of a polarization filter.

FIG. 3A shows two pixels that correspond to two points on an object in a scene. FIG. 3B shows a plot of (a) intensity of each of the two pixels 301, 303, respectively, versus (b) angle of a polarization filter. For example, the polarizer may be rotated at 0 degrees, 30 degrees, 60 degrees, 90 degrees, 120 degrees and 150 degrees. FIG. 3B shows that the plot of intensity of a pixel against filter angle is a sinusoid. The phase encodes azimuth angle and the amplitude and offset encode zenith angle. In FIG. 3B, sinusoids 311 and 312 are the plots of the intensity of pixels 301 and 303, respectively, against polarizer angle.

For diffuse reflection, the phase of the sinusoid in FIG. 3B may be expressed as the location of the peak of the sinusoid. Thus, for diffuse reflection, it is equivalent to say that the phase delay is found by finding the peak image intensity as the polarizer is rotated. But this peak intensity occurs when the reflected light is purely s-polarized (following from the Fresnel equations). Therefore, for diffuse reflections, the azimuth angle matches the polarizer angle at peak image intensity.

The azimuth angle for specular reflection is rotated by plus or minus 90 degrees from the azimuth angle for diffuse reflections.

In illustrative implementations, a photograph is captured with a polarizer at an angle $\phi_{pol}$. At a single image point, the intensity may be written as $$I(\phi_{pol}) = \frac{I_{max} + I_{min}}{2} + \frac{I_{max} - I_{min}}{2}\cos(2(\phi_{pol} - \varphi)) \quad \text{(Eq. 1)}$$

where the three unknown variables in this equation are $I_{max}$, $I_{min}$, and φ, shown in FIG. 3B.

That is, for each pixel: (a) $I_{max}$ is the maximum intensity of the pixel, when plotted against polarizer angle; (b) $I_{min}$ is the minimum intensity of the pixel, when plotted against polarizer angle; and (c) φ is the phase of the sinusoidal plot of intensity of the pixel against polarizer angle.

Sampling different values on the sinusoid amounts to taking pictures with different rotations of the polarizer angle.

By sampling three values of $\phi_{pol}$, it is sufficient to characterize the amplitude, phase, and offset of the received signal. The offset of the signal is the mean value of the sinusoid, or the DC offset. This is expressed as $0.5*(I_{min}+I_{max})$.

The azimuth angle φ is encoded as the phase of the received signal. However, note that the solution is not unique: two azimuth angles, shifted apart by π radians cannot be distinguished in the polarized images. Concretely, note that an azimuth angle of φ and φ+π return the same value for Equation 1. In illustrative implementations of this invention, this 180-degree ambiguity is eliminated, as described below.

The zenith angle θ of the surface normal may be obtained as follows: The degree of polarization is based on the amplitude and offset of Equation 1. The degree of polarization ρ may be written as $$\rho = \frac{I_{max} - I_{min}}{I_{max} + I_{min}} \quad \text{(Eq. 2)}$$

Substituting the Fresnel equations into Equation 2 allows the degree of polarization ρ to be written as $$\rho = \frac{\left(n - \frac{1}{n}\right)^2 \sin^2\theta}{2 + 2n^2 - \left(n + \frac{1}{n}\right)^2 \sin^2\theta + 4\cos\theta\sqrt{n^2 - \sin^2\theta}}, \quad \text{(Eq. 3)}$$

where n denotes the refractive index and θ the zenith angle.

Equation 3 sets forth the degree of polarization for diffuse reflections. Often, refractive index is unknown. But usually dielectrics have refractive index between 1.3 and 1.6. In that range of refractive index, the degree of polarization is not sensitive to the refractive index.

Equation 3 is robust for diffuse reflection from dielectric surfaces, but cannot be used for specular reflection from non-dielectric surfaces, such as mirrors or metals. For specular reflection from non-dielectric surfaces, the zenith angle θ may be calculated using Equation 4:

$$\rho^{spec} = \frac{2n\tan\theta\sin\theta}{\tan^2\theta\sin^2\theta + |n^*|^2}, \quad \text{(Eq. 4)}$$

where $|n^*|^2 = n^2(1+\kappa^2)$, κ is the attenuation index of the material, and $\rho^{spec}$ is the degree of specular polarization.

In illustrative implementations of this invention, a computer determines, based on the degree of polarization at a single pixel, whether to use Equation 3 or 4 to calculate the zenith angle θ. Diffusely reflected light has far less polarization than specularly reflected light. Therefore, diffusely reflected light will have a low degree of polarization ρ, while specularly reflected light will have a much higher degree of polarization ρ. Based on the value of ρ, a computer determines whether to use Equation 3 or 4, in order to calculate the zenith angle. If ρ is less, Equation 3 is used. If ρ is more, Equation 4 is 4.

In practice, the index of refraction n is often unknown. However, in practice, the index of refraction for a dielectric material may be treated as a constant (e.g., 1.5). This achieves accurate results because the error due to refractive distortion is small for a dielectric.

In some implementations of this invention, the unknown surface is always treated as a dielectric. In that case, there is no attenuation index, and n is treated as being equal to 1.5. This causes distortion if the unknown surface is actually a non-dielectric (e.g. mirror or metal). But the coarse depth map from the depth sensor 101 is used to correct for this distortion by analyzing the low spatial frequency mismatch, as described below.

The zenith angle θ and azimuth angle φ may each be estimated either in closed-form, or by numerical optimization. For example, in some cases, a numerical solution is based on gradient descent.

As noted above, Equation 3 may be solved for the zenith angle, θ. For example, Equation 3 may be solved in closed-form using the following code snippet:
% r is the degree of polarization, rho
% n is the refractive index $$aa=(n-1/n)^2+r*(n+1/n)^2;$$

$$bb=4*r*(n^2+1)*(aa-4*r);$$

$$cc=bb^2+16*(r)^2*(16*(r)^2-aa^2)*(n^2-1)^2;$$

$$dd=((-bb-cc^{\wedge}(1/2))/(2*(16*(r)^2-aa^2)))^{\wedge}(1/2);$$

estimated_zenith=a sin(dd);
Depth-Polarization Fusion

In illustrative implementations of this invention, one or more computers calculate 3D shape of a scene, by using a mathematical model that assumes that the scene has the following properties: (1) unpolarized ambient light; (2) no specular interreflections; (3) only dielectric materials or low-frequency changes in materials; and (4) diffuse-dominant or specular-dominant surfaces. At first glance, assumption 4 may seem limiting, however practical results are obtained on scenes with varying surface reflectivity. Assumption 4 need not be strictly met to obtain excellent results.

In illustrative implementations, a coarse depth map is used to correct systematic distortions in the surface normals from polarization. Let $D \in \mathbb{R}^{M \times N}$ denote the depth map obtained from the depth sensor 101.

In illustrative implementations of this invention, the correction scheme operates in the normal domain, so surface normals are extracted from the coarse depth map. These surface normals from the coarse depth map are denoted as $N^{depth} \in \mathbb{R}^{M \times N \times 3}$.

The coarse depth map contains quantization errors and noise, so preferably a robust method is used to extract surface normals from it.

In some implementations, a plane principal component analysis technique is used to obtain surface normals from the coarse depth map, as follows: First, the depth map $D \in \mathbb{R}^{M \times N}$ is written as a point cloud of real-world coordinates as $$P_{x,y} = \left[ -\frac{u}{f_x} D_{x,y} \quad -\frac{v}{f_x} D_{x,y} \quad D_{x,y} \right]^T,$$

where u and v denote pixel coordinates and $f_x$ and $f_y$ denote the focal length in units of pixels. Given the point cloud, a neighborhood search algorithm is used to form patches for each point (x,y). The smooth normal vector is found by stacking all points in the neighborhood as rows of the three-column matrix Q and optimizing $$N_{x,y}^{depth} = \underset{\vec{n}}{\operatorname{argmin}} \|(Q - \tilde{Q})\vec{n}\|_2^2,$$

where the matrix $\tilde{Q}$ contains the centroid of Q in all rows. The smoothness of $N^{depth}$ may be changed by controlling the size of the neighborhood that the search algorithm returns. This smoothing parameter is chosen in accordance with the cutoff frequency $\omega_{LPF}$.

Figures 4A, 4B, 4C, 4D, 4E:
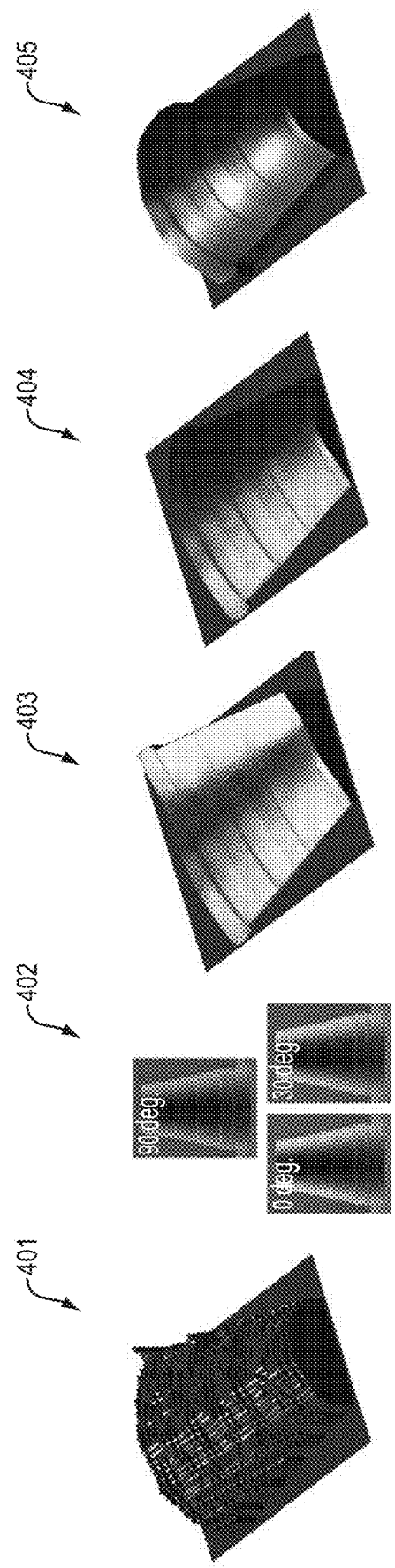
FIGS. 4A-4E illustrate enhancement of a depth map.

FIGS. 4A-4E illustrate enhancement of a depth map. FIG. 4A shows a coarse depth map 401 of a Styrofoam® cup. The coarse depth map is produced by a Kinect® depth sensor. FIG. 4B shows three images 402 captured at different angles of a polarization filter. FIG. 4C shows a depth map 403 computed from polarization cues. This depth map 403 has a 180-degree azimuthal ambiguity (causing the vertical flip of the cup), and a distortion of the zenith angle (appearing as flatness in the shape). FIG. 4D shows a depth map 404 from which azimuthal ambiguity has been removed. FIG. 4E shows an enhanced depth map 405 in which the zenith distortion is corrected. The enhanced depth map 405 is produced by using a coarse depth map as a constraint to correct ambiguities in polarization normals.

FIGS. 5A-5D illustrate depth maps of a corner in a scene. FIG. 5A shows the actual "ground truth" shape 501 of a corner. FIG. 5B shows a coarse depth map 502 produced by a Kinect® depth sensor. FIG. 5C shows a depth map 503 calculated from polarization normals. FIG. 5D shows an enhanced depth map 504 produced by using the coarse depth map to correct ambiguities in polarization normals.
Removing Low-Frequency Azimuthal Ambiguity Consider the corner scene in FIGS. 5A to 5D. Using a coarse depth sensor, a low-frequency version of the surface is acquired (note the smoothness in the 3D shape in FIG. 5B). On the other hand, the shape from polarized normals is very inaccurate due to the azimuthal flip, but the high-frequency detail may be recovered.

Let $N^{depth}$ denote the normal map obtained from polarization cues. The goal is to find an operator $\mathcal{A}$ that relates $N^{polar}$ and $N^{depth}$, which may be expressed numerically as $\hat{\mathcal{A}} = \arg \min \mathcal{A} \|N^{depth} - \mathcal{A}(N^{polar})\|_2^2$. Without any additional constraints, this optimization is ill-posed. However, to resolve polarization ambiguity, $\mathcal{A}$ may be represented as a binary, linear operator. The two states correspond to rotating the azimuth angle by π, or not. Since the goal is to solve low-frequency ambiguity, an additional constraint is imposed: that $\mathcal{A}$ is a smooth operator in the sense of total variation. Taken together, this may be expressed as a total variation minimization problem:

$$\hat{\mathcal{A}} = \operatorname{argmin}_{\mathcal{A}} \|N^{depth} - \mathcal{A}(N^{polar})\|_2^2 + \gamma \|\nabla \mathcal{A}\|_1 \quad \text{(Eq. 5)}$$

subject to $\mathcal{A} \in \{0, 1\}$, where the parameter $\gamma$ controls the piecewise smoothness of the solution.

A variety of approaches may be used to solve this optimization problem. In illustrative implementations of this invention, graph-cuts are employed. After obtaining $\hat{\mathcal{A}}$, low-frequency changes in the ambiguity may be corrected by applying the operator to the polarization normal:

$$N^{corr} = \hat{\mathcal{A}}(N^{polar}) \quad \text{(Eq. 6)}$$

where $N^{corr}$ is a corrected normal map.

In the example shown in FIGS. 5A-5D, the ambiguity was low-frequency in nature, so the coarse depth map was sufficient to correct it.

Removing High-Frequency Azimuthal Ambiguity

If the depth map is coarse, consisting of low-frequency information, then it cannot be used to resolve regions with high-frequency ambiguity. In illustrative implementations of this invention, a computer forces these regions of the surface to be closed, when calculating a 3D shape.

Figure 6C:
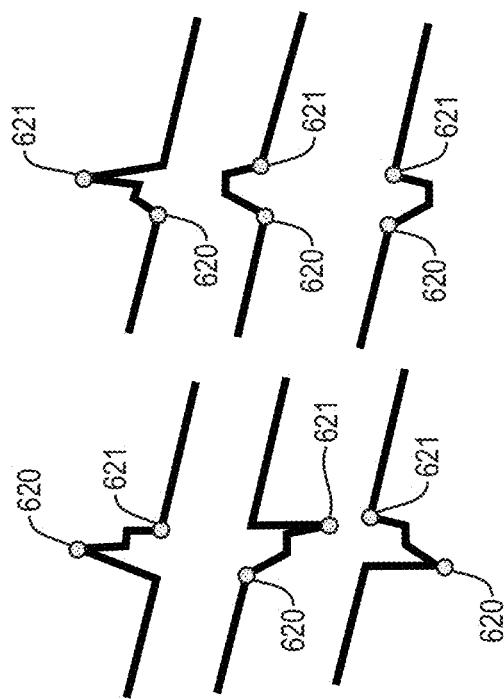
FIGS. 6A, 6B and 6C illustrate azimuthal ambiguity in a high-spatial frequency region.
Figure 6B:
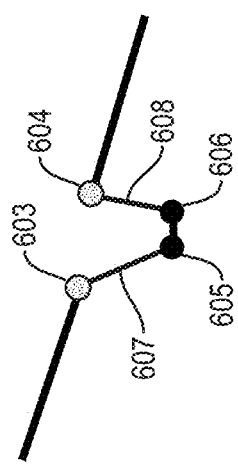
Figure 6A:
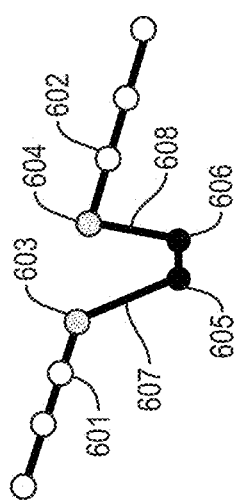

FIGS. 6A, 6B and 6C illustrate azimuthal ambiguity in a high-spatial frequency region. In FIGS. 6A, 6B and 6C, correct points (e.g., 601, 602) are located in a low-frequency region of the surface. Anchor points (e.g., 603, 604, 620, 621) are each located at a boundary between the low-frequency region and a high-frequency ridge. Pivot points (e.g., 605, 606) are located in the high frequency ridge. The pivot points are indicated by the polarization normals but not by the coarse depth map. FIGS. 6A, 6B, and 6C also show facets (e.g. 607, 608). Each facet is a set of points between an anchor point and a pivot point.

FIG. 6A shows a conceptual example of a high-frequency V-groove on a plane. The coarse depth map misses the high-frequency region and simply detects a plane.

In the example shown in FIGS. 6A, 6B and 6C, the normals are disambiguated correctly on the plane, but the ridge cannot be disambiguated using the method described in the "Removing Low-Frequency Azimuthal Ambiguity" section above. In particular, observe that the high-frequency ridge may take one of six forms. To constrain the problem, define an anchor point at the start of the high frequency region and a pivot point at the center of the ridge. The anchor point represents the boundary condition for the high-frequency ridge and the pivot point occurs on a fronto-parallel part of the surface, i.e., where the zenith angle is close to zero.

A facet is defined as the set of points between an anchor point and a pivot point. A facet may form a planar or nonplanar surface. Assuming there are K facets, there are $2 \times 2^K - V$ possible surface configurations, where V is the number of possible closed surfaces. This surface has two facets and two closed configurations, and therefore six possible surface configurations. Four of these are not closed, i.e., the high-frequency region has a discontinuity at an anchor point. The discontinuity is physically possible—i.e., the V-groove could actually be a ramp in the real world—but it is less likely that the high frequency detail has such a discontinuity exactly at the anchor point. Therefore, in illustrative implementations, a computer assumes that the high-frequency surface is closed.

Of the two closed surfaces, one is concave and the other is convex. There is no way to distinguish between these surfaces using polarization cues. This is not unique to polarization enhancement: the convex/concave ambiguity applies to the entire surface from SfS and uncalibrated PS.

As shown in FIG. 6C, each facet may be rotated by $\pi$ radians, creating ambiguities.

Correcting for Refractive Distortion

Recall that estimation of the zenith angle requires knowledge of the refractive index. For materials within the dielectric range, deviation in the estimated zenith angle is only a minor source of error. However, for non-dielectrics, the zenith angle surface normal will be distorted, which when integrated, causes distortions to the 3D shape. (Zenith distortion may also occur when assumption 4 is violated. In such a case, model mismatch occurs because a mixed diffuse and specular surface does not conform to either Equation 3 or 4. Because a deviation is observed only in the zenith angle, Equation 8 serves a dual purpose of correcting both refractive distortion and model mismatch error.)

In illustrative implementations of this invention, distortion in zenith angle is corrected as follows: First, find the regions of the depth map that provide a good estimate of the coarse object shape. Specifically, define a binary mask as $$M = 1 \text{ if } \nabla^T N^{depth} \leq \epsilon \text{ and } \nabla^T N^{corr} \leq \epsilon M = 0 o.w. \quad \text{(Eq. 7)}$$

where $\epsilon$ is a smoothness threshold.

In illustrative implementations of this invention, $\epsilon$ is a fixed threshold representing the detail in the surface, and is the same for all surfaces. Which value of $\epsilon$ is used varies depending on the cameras used, and whether normalization is performed. In a prototype of this invention, $\epsilon$ is 3.2.

Intuitively, the mask M takes the value of 1 in confident regions, where the object lacks high-frequency detail (as determined by the polarization normals) and zero otherwise. For both of the inequalities in Equation 7, the left-hand-side of the inequality is lower for smoother surfaces (i.e., with less high frequency detail).

For the corner in FIGS. 5A-5D, observe that the sharp point of the corner—where the depth sensor data is inaccurate due to multipath light transport—is masked out since the divergence in $N^{corr}$ is high.

Let $\theta^{depth}$ and $\theta^{corr}$ denote the zenith components of $N^{depth}$ and $N^{corr}$ from the "Removing Low-Frequency Azimuthal Ambiguity" section above. Within each patch, rotate the corrected normals, i.e., $\hat{\mathcal{R}} = \arg \min \mathcal{R} \|M \odot \theta^{depth} - \mathcal{R}(\theta^{corr})\|_2^2$, where $\odot$ is the Hadamard product operator. To correct for refractive index, the normals are updated by applying the rotation operator $$N^{corr} := \hat{R}(N^{corr}) \quad \text{(Eq. 8)}$$

Corrected Polarization Normals to Enhance Coarse Depth Map

The corrected normals may be integrated to obtain the 3D shape. Surface normal integration is a challenging task due to depth discontinuities.

In illustrative implementations of this invention, to recover accurate 3D shape, an integration scheme incorporates the input depth map (D) and physical intuition from polarization ($N^{corr}$) to recover the depth coordinates of the surface $D \in \mathbb{R}^{M \times N}$.

Spanning Tree Constraint

A conventional way to integrate surface normals uses the Poisson equation, written as $\nabla^2 D = \nabla^T N^{corr}$ here. The Poisson equation is the optimal solution in the sense of least squares and works well when the noise model is asystematic.

However, for the polarization problem, the surface normals have systematic error, and thus the conventional Poisson equation is not suitable for surface normal integration in the context of this invention. Intuitively, it is desirable to avoid integration using unreliable surface normals.

In illustrative implementations of this invention, the surface may be recovered in closed form by using only the minimum spanning tree over a weighted, 2D graph (the spanning tree is found using Kruskal's algorithm). The optimal solution is written as $$\nabla_S^2 \hat{D} = \nabla_S^T N^{corr} \qquad (Eq. 9)$$

where S denotes the set of gradients used in the reconstruction and $\nabla_S^2$ and $\nabla_S^T$ represent Laplace and divergence operators computed over S.

For accurate integration, the set S includes a spanning tree of the graph. Let $W_{x,y}$ denote the weights of the 2D grid.

In illustrative implementations of this invention, the physics of polarization motivate the selection of graph weights. Specifically, the polarization normals are considered to be noisy when the degree of polarization $\rho$ is low. A low degree of polarization most commonly occurs when the zenith angle is close to zero (i.e. fronto-parallel surfaces). For the depth map, the mask operator M provides a weight of confidence.

In illustrative implementations, S, the set of gradients used in the integration, is initialized as the empty set. The first gradients that are added to S are those that lie on the minimum spanning tree of the weighted graph with weights $$W = \rho \text{ if } \rho > \tau \text{ and } M = 0, W = \tau \text{ otherwise}, \qquad (Eq. 10)$$

where $\tau$ reflects the level of confidence in the polarization vs depth normals. The value of $\tau$ is selected heuristically. In a prototype of this invention, a value of 0.05 for $\tau$ works well. Intuitively, this means that polarization information is rejected, if it comes from a reflection that has a 5% or less degree of polarization. In illustrative implementations, values for each of $\tau$ and $\epsilon$ are constant for all scenes.

As noted above, $\tau$ reflects the level of confidence in the polarization vs depth normals. An example illustrates this point: Suppose that the reflected light is perfectly unpolarized (i.e., the degree of polarization $\rho = 0.00$). In that case, it is hard to glean information from the polarization cues, and the normals from the coarse depth map may be more accurate. Therefore, $\tau$ represents the threshold at which polarization normals are preferred. Setting a value of $\tau$ to be 0.05, means that if the reflected light has more than a 5% degree of polarization, it is preferable to use the polarization information over the depth information.

After the first gradients are added to S (as described above), S is updated by using an iterative α-approach, with the additional inclusion of both and $N^{depth}$ in the update process. Then, the corrected normals are updated as $$N_{x,y}^{corr} := N^{corr} \text{ if } W_{x,y} \leq \tau \qquad (Eq. 11)$$

For the spanning tree, the edges of the graph are the gradients. Each gradient is the gradient of the surface normal at a given pixel. The nodes of the graph are pixels/image points.

In illustrative implementations, outliers are removed that have a low degree of polarization. Preferably, edges are removed that have a degree of polarization less than 5%. However, this is not a sufficient condition to remove an edge. This is because, the given edge may be necessary to satisfy the spanning constraint. When removing an edge, it is not necessary to consider if the reflection was diffuse or specular (the "cause"), instead only the "symptom"—whether $\rho$ is low or not.

Often, a low zenith angle occurs when the surface is fronto-parallel, and thus the reflected light is mostly unpolarized, and therefore the data is not so reliable. But a surface with a low zenith angle may still reflect polarized light if it has a high refractive index or if the reflection is specular.

In many practical scenarios, the degree of polarization is low for (1) fronto-parallel surfaces (low zenith angle); or (2) diffuse reflections.

The spanning tree itself is a tool to break unreliable polarization gradients. A gradient is unreliable if (a) the degree of polarization is low leading to noisy azimuth and zenith angles or (b) there is mismatch between the polarization and depth normals due to refractive distortion. Therefore, the spanning tree itself solves the second and third errors of SfP that are mentioned in the Introduction section above.

Depth Fidelity Constraint

When integrating surface normals, only a relative 3D shape up to an unknown offset and scaling is obtained.

In illustrative implementations of this invention, a depth fidelity constraint serves to preserve the global coordinate system and enforce consistency between the integrated surface and accurate regions of the depth map. Specifically, the depth constraint takes the form of $$\|M \odot (\hat{D} - D)\|_2^2$$

where Hadamard element-wise multiplication with the mask enforces fidelity only where the depth map is reliable.

In illustrative implementations of this invention, both the depth fidelity and spanning tree constraints are incorporated into a sparse linear system $$\begin{bmatrix} \lambda M \odot I \\ \nabla_S^2 \end{bmatrix} VEC(\hat{D}) = \begin{bmatrix} \lambda VEC(M \odot D) \\ \nabla_S^T (N^{corr}) \end{bmatrix} \qquad (Eq. 13)$$

where VEC denotes the vectorization operator, I is the identity matrix of size MN×MN and $\lambda$ is a scalar parameter to adjust the tradeoff between spanning tree and depth fidelity constraints.

Equation 13 exploits knowledge of where outliers exist. Specifically, this is achieved by removing gradients that are based on locations with a low degree of polarization.

The sparse linear inversion described in Equation 13 may be implemented using the following code snippet:

```
% input lambda, corresponding to \lambda
% input dm: depth map corresponding to \mathbf{D}
% input f: divergence operator
A=Laplacian( );
A_bot=sparse(numel(dm));
for ii=1:numel(dm)
A_bot(ii,ii)=lambda;
end
f_bot=zeros(numel(dm),1);
f_bot=lambda; *vec(-dm);
A=[A; A_bot];
f=[f(:); f_bot];
high_resolution_depth=-A(:,2:end)\f(:); % high resolution depth map
```

In illustrative implementations, $\lambda$ in Equation 13 is selected heuristically, depending on the hardware employed. In a prototype of this invention, $\lambda$ is set at 0.02. If, however, the imaging system includes a highly accurate depth sensor, it might be desirable to set lambda to 0.05, because in that case data from the depth sensor camera may be more trustworthy.

In Equation 13, unreliable gradients are disregarded by using the mask M and $N^{corr}$. Specifically, the mask M, defined in Equation 7, causes regions of the coarse depth map that are unreliable to be disregarded. Also, $N^{corr}$, defined in Equation 11, effectively removes regions of the polarization normals that are unreliable (subject to the minimum span constraint).

In Equation 13, both the depth fidelity and spanning tree constraints are incorporated into a sparse linear system. Equation 13 may be solved with standard numerical optimization techniques.

Equation 13 includes the depth map in the matrix formulation. Thus, Equation 13 solves the fourth and fifth errors of SfP that are identified in the Introduction section above.

Figure 7:
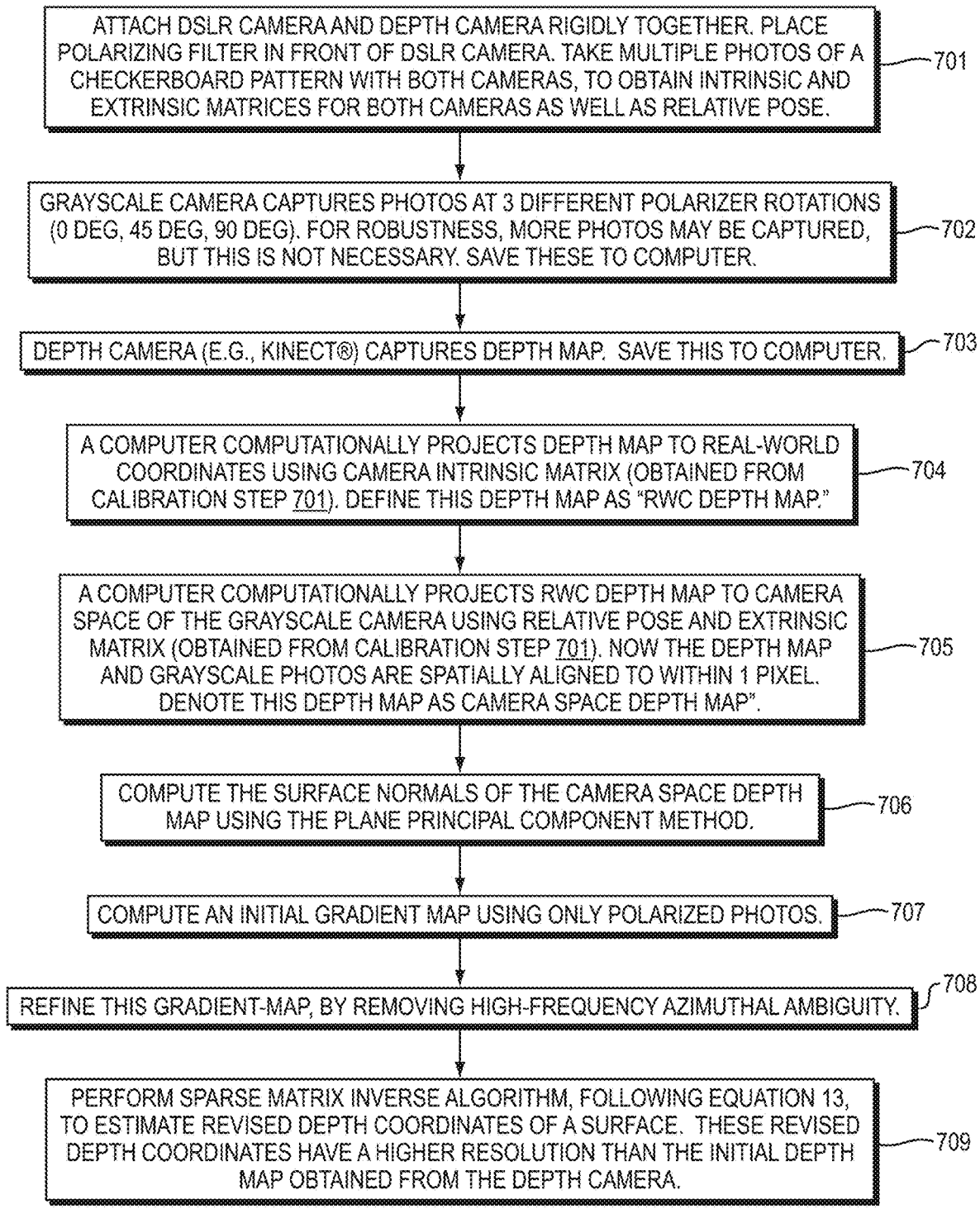
FIG. 7 is a flow chart that shows steps in a method for generating an enhanced depth.

FIG. 7 is a flow chart that shows steps in a method for generating an enhanced depth map by using polarization cues. These steps include: Attach DSLR camera and depth sensor rigidly together. Place polarizing filter in front of DSLR camera. Take multiple photos of a checkerboard pattern with both cameras, to obtain intrinsic and extrinsic matrices for both cameras as well as relative pose. (Step 701) Grayscale camera captures photos at 3 different polarizer rotations (0 degrees, 45 degrees, 90 degrees). For robustness, more photos can be captured, but this is not necessary. Save these to computer (Step 702). Depth sensor (e.g., Kinect®) captures depth map. Save this to computer (Step 703). A computer computationally projects depth map to real-world coordinates using the camera intrinsic matrix obtained from calibration step 701. The depth map resulting from this projection onto real-world coordinates is sometimes called the "RWC depth map" herein (Step 704). A computer computationally projects the RWC depth map to the camera space of the grayscale camera using relative pose and the extrinsic matrix obtained from calibration step 701. The depth map resulting from this projection onto the camera space is sometimes called the "camera space depth map" herein. The camera space depth map and grayscale photos are spatially aligned to within 1 pixel (Step 705). Compute the surface normals of the "camera space depth map" using the plane principal component method (Step 706). Compute an initial gradient map using only polarized photos (Step 707). Refine this gradient-map, by removing high-frequency azimuthal ambiguity (Step 708). Perform sparse matrix inverse algorithm, in accordance with Equation 13, to estimate revised depth coordinates of a surface. These revised depth coordinates have a higher resolution than the initial depth map obtained from the depth sensor (Step 709).

In the context of FIG. 7 and the text describing FIG. 7, "projection" is used in the linear algebraic sense. In that context, "projection" is a sequence of matrix multiplications that is implemented in software to warp the depth map image to the grayscale image.

Scene Properties

As noted above, in illustrative implementations of this invention, one or more computers calculate 3D shape of a scene, by using a mathematical model that assumes that the scene has the following properties: (1) unpolarized ambient light; (2) no specular interreflections; (3) only dielectric materials or low-frequency changes in materials; and (4) diffuse-dominant or specular-dominant surfaces. These four assumptions are now discussed in more detail.

Unpolarized World Lighting Assumption: Natural sources of light produce unpolarized light. These include candles, sunlight, incandescent and fluorescent lights. Some manmade light sources, such as LEDs and Lasers, are polarized. However, in practical settings, these LED or laser light sources are placed behind diffusing material, such as ground glass or opal glass diffusers. Such materials are well-known depolarizers of light. This forms the basis for the unpolarized world assumption.

Material properties: The computer assumes that one of the following is true: (a) all materials in the scene are dielectric, or (b) material transition is low-frequency in nature. Dielectrics have a refractive index in the range of 1.3 to 1.8. Suppose that the refractive index of a dielectric scene is initially unknown. If a value within the middle of the range is used, specifically 1.5, then the refractive distortion will be miniscule. For dielectric material, if a refractive index of 1.5 is assumed, the maximal shape distortion is within 0.5 percent of the true shape. While not ideal, in a practical setting, refractive distortion is only a minor source of error.

Low-frequency assumption: In illustrative implementations of this invention, refractive distortion is corrected by matching the refractive index to the coarse shape obtained from the depth map. In practice, this is implemented by applying a patch-based rotation in the gradient domain. To obtain a sufficiently large patch for correction, it is desirable that the material change is low-frequency in nature. In practice, a 3×3 patch of pixels is sufficient to correct for refractive distortion. In most real-world scenes, acquired from depth sensors, the material is constant over a 3×3 neighborhood.

Diffuse dominant or specular dominant assumption: In illustrative implementations of this invention, it is assumed that for each facet in a scene, the type of reflection measured by the camera is either specular-dominant or diffuse-dominant. Empirically, this assumption leads to good practical results.

The degree of polarization $\rho$ is dependent on both diffuse and specular components. But Equations 3 and 4 from the main paper rely on either diffuse-only or specular-only reflections. This causes a model mismatch for materials with both diffuse and specular components. However, there is already a model mismatch due to refractive index.

In illustrative implementations, this invention achieves accurate results despite these two model mismatches, for the following reasons: Unstable azimuth perturbation occurs only when diffuse and specular components are nearly equal. This will not happen in many scenes, and in particular it will not happen at many scene points. In the case of zenith perturbation due to model mismatch, the correction that is applied to the zenith angle to correct refractive error (i.e., rotating the zenith angle to match the depth normal) also serves to correct for the diffuse/specular perturbation in zenith angle.

By using the depth map to place numerous constraints on the shape-from-polarization problem, this invention resolves many of the ambiguities in prior shape-from-polarization (SfP) while demonstrating compelling advantages over alternative techniques (SfS and PS). In particular, SfS and PS assume Lambertian objects and distant/controlled lighting, while this invention achieves accurate results on diffuse to mirror-like objects in controlled and uncontrolled settings. Moreover, this invention may be made passive, may be implemented in a single-shot, and requires no baseline.

Computers

In exemplary implementations of this invention, one or more electronic computers (e.g. 105, 155) are programmed and specially adapted: (1) to control the operation of, or interface with, hardware components of a 3D imaging system, including a digital camera, a polarizer, and a depth sensor; (2) to calculate zenith angles and azimuth angles for a set of surface normals from polarization cues, (3) to compute surface normals from a depth map produced by a depth sensor; (4) to use a coarse depth map as a constraint to correct ambiguities in polarization normals; (5) to perform any other calculation, computation, program, algorithm, or computer function described or implied above; (6) to receive signals indicative of human input; (7) to output signals for controlling transducers for outputting information in human perceivable format; and (8) to process data, to perform computations, to execute any algorithm or software, and to control the read or write of data to and from memory devices (items 1-8 of this sentence referred to herein as the "Computer Tasks"). The one or more computers may be in any position or positions within or outside of the 3D imaging system. For example, in some cases (a) at least one computer is housed in or together with other components of the 3D imaging system, such as a grayscale camera or depth sensor, and (b) at least one computer is remote from other components of the 3D imaging system. The one or more computers are connected to each other or to other components in the 3D imaging system either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory (e.g., 106, 156). In some cases, one or more computers (e.g., 105, 155) store data in, or retrieve data from, a memory device (e.g., 106, 156).

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Definitions

The terms "a" and "an", when modifying a noun, do not imply that only one of the noun exists.

To say that a second depth map is more "accurate" than a first depth map means that the mean squared error of depth coordinates in the second depth map is less than the mean squared error of depth coordinates in the first depth map. For purposes of the preceding sentence, for a given scene point and a given depth map, error is the discrepancy between the point's depth coordinate as indicated by the given depth map and the point's actual depth coordinate.

"Azimuth angle" of a polarization surface normal means an angle between a first line and a second line, where: (a) the first line is an orthogonal projection of the polarization surface normal onto an image plane of a camera that captures polarized images from which the azimuth angle is calculated, and (b) the second line lies entirely in the image plane and is oriented in a reference direction.

To compute "based on" data means to perform a computation that takes the data as an input.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

"Depth sensor" means a sensor that outputs a depth map.

"Depth map" means data (a) that specifies the absolute 3D position of a set of points in a scene, or (b) from which the absolute 3D position of a set of points in the scene is computable, without requiring any additional information about the scene.

The term "e.g." means for example.

Each equation above is referred to herein by the equation number set forth to the right of the equation. For example: "Equation 3" means Equation 3 above. "Equation 4" means Equation 4 above. "Equation 7" means Equation 7 above. "Equation 10" means Equation 10 above. "Equation 13" means Equation 13 above.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

"Fresnel equation" means an equation that takes into account the behavior of light when moving between media of differing refractive indices. An equation may be a "Fresnel equation" without being in the form deduced by Augustin-Jean Fresnel. For example, Equation 3 and Equation 4 are non-limiting examples of Fresnel equations.

As used herein, "graph" means a set of nodes and edges. Nodes are also known as vertices. Edges are also known as links.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

To say that a calculation is "in accordance with" a first equation means that the calculation involves (a) solving the first equation or computing a value of a side of the first equation; or (b) solving a second equation or computing a value of a side of the second equation, where the second equation is derived from the first equation, such as by algebraic manipulation of the first equation or by performing the same mathematical operation on both sides of the first equation. Non-limiting examples of "solving" an equation include solving the equation in closed form or by numerical approximation.

The term "include" (and grammatical variations thereof) shall be construed as if followed by "without limitation".

To "integrate" means either (a) to perform integration in the calculus sense, or (b) to compute a sum of discrete samples.

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"I/O device" means an input/output device. Non-limiting examples of an I/O device include any device for (a) receiving input from a human user, (b) providing output to a human user, or (c) both. Non-limiting examples of an I/O device also include a touch screen, other electronic display screen, keyboard, mouse, microphone, handheld electronic game controller, digital stylus, display screen, speaker, or projector for projecting a visual display.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

"Linear image" means a digital image in which a value for each respective pixel of the image is proportional to intensity of light measured at the respective pixel. For example, a JPG image is not a linear image.

As used herein, (i) a single scalar is not a "matrix", and (ii) one or more entries, all of which are zero (i.e., a so-called null matrix), is not a "matrix".

To "multiply" includes to multiply by an inverse. Thus, to "multiply" includes to divide.

"180-degree ambiguity" means that (a) azimuth angle is either a first angle or a second angle, the second angle being equal to the first angle plus or minus 180 degrees, but (b) it is unknown which angle—the first or second angle—is the correct azimuth angle. To "eliminate 180-degree ambiguity" means to determine which one of the first and second angles is the correct azimuth angle.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Polarization normal data" means data (a) that specifies polarization surface normals for a surface; or (b) that is computable from polarization surface normals for a surface, without requiring further information about the surface.

"Polarization surface normal" means a surface normal, the orientation of which is calculated by a computation that involves a Fresnel equation.

"Polarized image" means a digital image that records light that has been filtered depending on state of polarization. "Capturing a polarized image" includes processing raw data to output a linear image.

"Polarizer angle" means an angular orientation of a polarizer filter with respect to a reference direction.

As used herein, the term "set" does not include a group with no elements. Unless otherwise specified, a set may have one or more elements. Mentioning a first set and a second set does not, in and of itself, create any implication regarding whether or not the first and second sets overlap (that is, intersect).

"Some" means one or more.

To say—in the context of an apparatus that produces a first depth map and second depth map of a surface in a scene—that a second depth map is more accurate than a first depth map "under standard testing conditions" means that if the first and second depths were captured by the apparatus under the conditions specified in the last sentence of this paragraph, then the second depth map would be more accurate than the first depth map. It has no implication regarding accuracy when the conditions are not satisfied. The conditions are: (a) the scene is illuminated by only unpolarized ambient illumination during capture of any polarized images included in the set of images; (b) the scene has no specular interreflections; (c) the surface is entirely dielectric; and (d) the surface is planar and is off-angle relative to the imaging system that captures the depth map. For purposes of the preceding sentence: (a) "dielectric" means having an index of refraction in the range of 1.3 to 1.8; and (b) to say that a surface is "off-angle" to an imaging system means that the angle between the plane of the surface and at least one image plane of the imaging system is greater than five degrees. For purposes of this paragraph, an "image plane" of the imaging system means an image plane of a sensor in the imaging system, which sensor captures at least some of the polarized images. For purposes of this paragraph, when determining whether the scene is illuminated by only unpolarized ambient illumination, any illumination at a wavelength that is not captured in, or that is filtered out of, the polarized images is disregarded.

As used herein, a "subset" of a set consists of less than all of the elements of the set.

"Substantially" means at least ten percent. For example: (a) 112 is substantially larger than 100; and (b) 108 is not substantially larger than 100.

The term "such as" means for example.

To say that a machine-readable medium is "transitory" means that the medium is a transitory signal, such as an electromagnetic wave.

"Zenith angle" of polarization surface normal means an angle between the surface normal and a second line, the second line being perpendicular to an image plane of a camera that captures polarized images from which the zenith angle is calculated.

A matrix may be indicated by a bold capital letter (e.g., D). A vector may be indicated by a bold lower case letter (e.g., α). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In some implementations, this invention is a method comprising, in combination: (a) one or more cameras (i) capturing a first set of images of an object, which first set of images comprises one or more images, and (ii) capturing a second set of images of the object, which second set includes a first polarized image, a second polarized image and a third polarized image, such that the first, second and third polarized images capture light that has been filtered at a first polarizer angle, a second polarizer angle and a third polarizer angle, respectively, the first, second and third polarizer angles being different from each other; and (b) one or more computers (i) calculating, based on the first set of images, a first depth map of a surface of the object, (ii) calculating polarization surface normals of the surface, by a computation that involves a Fresnel equation and that is based on the second set of images, and (iii) calculating, based on the first depth map and the polarization surface normals, a second depth map of the surface; wherein, for at least one point of the surface, the first depth map indicates a first absolute depth of the point and the second depth map indicates a second absolute depth of the point, the first and second absolute depths being different from each other. In some cases, calculating the second depth map includes solving Equation 13. In some cases, the first and second set of images are not identical sets. In some cases, the first depth map is calculated by a computation that does not involve a Fresnel equation. In some cases, calculating the second depth map involves treating the first depth map as a constraint on polarization normal data regarding the surface. Each of the cases described above in this paragraph is an example of the method described in the first sentence of this paragraph, and is also an example of an embodiment of this invention that may be combined with other embodiments of this invention.

In some implementations, this invention is a method comprising, in combination: (a) one or more cameras (i) capturing a first set of images of an object, which first set of images comprises one or more images, and (ii) capturing a second set of images of the object, which second set includes a first polarized image, a second polarized image and a third polarized image, such that the first, second and third polarized images capture light that has been filtered at a first polarizer angle, a second polarizer angle and a third polarizer angle, respectively, the first, second and third polarizer angles being different from each other; and (b) one or more computers (i) calculating, based on the first set of images, a first depth map of a surface of the object, (ii) calculating, based on the second set of images, a set of polarization surface normals of the surface, (iii) calculating, based on the polarization surface normals, a second depth map of the surface, (iv) calculating a minimum spanning tree of a graph, which graph is weighted based at least in part on degree of polarization of the polarization surface normals, (v) calculating a binary mask by a computation that includes calculating divergence and that specifies a first region of the first depth map and a second region of the first depth map, the first and second regions being different from each other, and (vi) modifying the second depth map, such that the modifying is based in part on the minimum spanning tree and in part on enforcing consistency between the second depth map and the first region of the first depth map. In some cases, the modifying involves computations that solve Equation 13. In some cases, the graph is weighted in accordance with Equation 10. In some cases: (a) the one or more cameras comprise a set of multiple cameras; and (b) the position, relative to the scene, of each camera in the set of cameras is different than the position, relative to the scene, of any other camera in the set of cameras. In some cases, the binary mask is calculated in accordance with Equation 7. In some cases, the one or more computers: (a) perform an initial calculation of azimuth angles of the polarization surface normals, such that the solution of the initial computation for each of the azimuth angles, respectively, has a 180-degree ambiguity, and (b) perform an additional calculation that involves minimizing total variation subject to a constraint and that eliminates the 180-degree ambiguity. In some cases, for each respective surface normal, out of the set of polarization surface normals, the method includes the one or more computers: (a) computing a degree of polarization of the respective surface normal; and (b) calculating a zenith angle of the respective surface normal (i) in accordance with Equation 3 if the degree of polarization of the respective normal is less than a threshold, and (ii) in accordance with Equation 4 if the degree of polarization of the respective surface normal is greater than the threshold. Each of the cases described above in this paragraph is an example of the method described in the first sentence of this paragraph, and is also an example of an embodiment of this invention that may be combined with other embodiments of this invention.

In some implementations, this invention is an apparatus comprising (a) one or more cameras for (i) capturing a first set of images of an object, which first set of images comprises one or more images, and (ii) capturing a second set of images of the object, which second set includes a first polarized image, a second polarized image and a third polarized image, such that the first, second and third polarized images capture light that has been filtered at a first polarizer angle, a second polarizer angle and a third polarizer angle, respectively, the first, second and third polarizer angles being different from each other; and (b) one or more computers that are programmed (i) to calculate, based on the first set of images, a first depth map of a surface of the object, (ii) to calculate polarization surface normals of the surface, by a computation that involves a Fresnel equation and that is based on the second set of images, and (iii) to calculate a second depth map of the surface, by a computation that treats the first depth map as a constraint on polarization normal data regarding the surface. In some cases, under standard testing conditions, the second depth map is substantially more accurate than the first depth map. In some cases, the second depth map is substantially more accurate than the first depth map. In some cases, the one or more computers are programmed to solve Equation 13. Each of the cases described above in this paragraph is an example of the apparatus described in the first sentence of this paragraph, and is also an example of an embodiment of this invention that may be combined with other embodiments of this invention.

In some implementations, this invention is an apparatus comprising, in combination: (a) one or more cameras for (i) capturing a first set of images of an object, which first set of images comprises one or more images, and (ii) capturing a second set of images of the object, which second set includes a first polarized image, a second polarized image and a third polarized image, such that the first, second and third polarized images capture light that has been filtered at a first polarizer angle, a second polarizer angle and a third polarizer angle, respectively, the first, second and third polarizer angles being different from each other; and (b) one or more computers that are programmed (i) to calculate, based on the first set of images, a first depth map of a surface of the object, (ii) to calculate, based on the second set of images, a set of polarization surface normals of the surface, (iii) to calculate, based on the polarization surface normals, a second depth map of the surface, (iv) to calculate a minimum spanning tree of a graph, which graph is weighted based at least in part on degree of polarization of the polarization surface normals, (v) to calculate a binary mask by a computation that includes calculating divergence and that specifies a first region of the first depth map and a second region of the first depth map, the first and second regions being different from each other, and (vi) to calculate a modification of the second depth map, such that the modification is based in part on the minimum spanning tree and in part on enforcing consistency between the second depth map and the first region of the first depth map. In some cases, the one or more computers are programmed to calculate the modification by computations that include solving Equation 13. In some cases, the one or more computers are programmed to calculate the binary mask in accordance with Equation 7. In some cases, the one or more computers are programmed to weight the graph in accordance with Equation 10. In some cases, the one or more computers are programmed: (a) to perform an initial calculation of azimuth angles of the polarization surface normals, such that the solution of the initial computation for each of the azimuth angles, respectively, has a 180-degree ambiguity, and (b) to perform an additional calculation that involves minimizing total variation subject to a constraint and that eliminates the 180-degree ambiguity. In some cases, the one or more computers are programmed, for each respective surface normal, out of the set of polarization surface normals: (a) to compute a degree of polarization of the respective surface normal; and (b) to calculate a zenith angle of the respective surface normal (i) in accordance with Equation 3 if the degree of polarization of the respective normal is less than a threshold, and (ii) in accordance with Equation 4 if the degree of polarization of the respective surface normal is greater than the threshold. In some cases, the one or more computers are programmed: (a) to identify a point of the surface, which point is at a boundary between a first area of the surface and a second area of the surface, which first area has a first spatial frequency and which second area has a second spatial frequency, the first spatial frequency being greater than the second spatial frequency; and (b) to calculate a 3D shape of the surface such that the 3D shape is continuous at the point. Each of the cases described above in this paragraph is an example of the apparatus described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. A method comprising:
   (a) capturing a first set of images of an object, which first set of images comprises one or more images;
   (b) capturing a second set of images of the object, which second set includes a first polarized image, a second polarized image and a third polarized image, in such a way that the first, second and third polarized images capture light that has been filtered at a first polarizer angle, a second polarizer angle and a third polarizer angle, respectively, the first, second and third polarizer angles being different from each other;
   (c) calculating, based on the first set of images, a first depth map of a surface of the object;
   (d) calculating, based on the first depth map, a first set of surface normals;
   (e) calculating a binary mask, based in part on divergence of the first set of surface normals;
   (f) calculating, based on the second set of images, polarization surface normals of the surface; and
   (g) performing a computation that (i) is based on the first depth map, the binary mask and the polarization surface normals, (ii) disregards gradients in a first region of the surface, the first region being a region in which degree of polarization is lower than in the rest of the surface, and (iii) calculates a second depth map of the surface, which second depth map is more accurate than the first depth map in part because the gradients in the first region of the surface are disregarded.

2. The method of claim 1, wherein the calculating of the polarization surface normals takes into account refractive indices.

3. The method of claim 1, wherein the calculating of the polarization surface normals takes into account behavior of light moving between media of different refractive indices.

4. The method of claim 1, wherein the first and second set of images are not identical sets.

5. The method of claim 1, wherein, in the calculating of the second depth map, the first depth map is a constraint on polarization normal data regarding the surface.

6. The method of claim 1, wherein the method includes capturing the second set of images with two cameras that are positioned in such a way that the surface is not fronto-parallel to both of the cameras.

7. The method of claim 1, wherein the second set of images are monochrome, polarized images.

8. The method of claim 7, wherein the polarized images are linear images.

9. The method of claim 1, wherein the method further comprises calculating a graph that is weighted based on the polarization surface normals.

10. The method of claim 9, wherein the computation of the second depth map is also based on a minimum spanning tree of the graph.

11. The method of claim 1, wherein the surface is dielectric and has a refractive index between 1.3 and 1.6.

12. The method of claim 1, wherein:
(a) the method includes calculating degree of polarization based in part on refractive index of the surface; and
(b) in the calculating of degree of polarization, the refractive index is assumed to be a constant that is identical for all surfaces.

13. The method of claim 1, wherein the method further includes computing zenith angle of a surface normal at a point of the surface in such a way that computed value of the zenith angle depends on degree of polarization at the point.

14. Apparatus comprising:
(a) one or more cameras configured
(i) to capture a first set of images of an object, which first set of images comprises one or more images, and
(ii) to capture a second set of images of the object, which second set includes a first polarized image, a second polarized image and a third polarized image, such that the first, second and third polarized images capture light that has been filtered at a first polarizer angle, a second polarizer angle and a third polarizer angle, respectively, the first, second and third polarizer angles being different from each other; and
(b) one or more computers that are programmed
(i) to calculate, based on the first set of images, a first depth map of a surface of the object,
(ii) to calculate, based on the first depth map, a first set of surface normals;
(iii) to calculate a binary mask, based in part on divergence of the first set of surface normals;
(iv) to calculate, based on the second set of images, polarization surface normals of the surface, and
(v) to perform a computation that (A) is based on the first depth map, the binary mask and the polarization surface normals, (B) disregards gradients in a first region of the surface, which first region is a region in which degree of polarization is lower than in the rest of the surface, and (C) calculates a second depth map of the surface, which second depth map is more accurate than the first depth map in part because the gradients in the first region of the surface are disregarded.

15. The apparatus of claim 14, wherein the one or more computers are programmed to calculate the polarization surface normals in a manner that takes into account refractive indices.

16. The apparatus of claim 14, wherein the one or more computers are programmed to calculate the polarization surface normals in a manner that takes into account behavior of light moving between media of different refractive indices.

17. The apparatus of claim 14, wherein the one or more computers are further programmed to calculate a graph that is weighted based on the polarization surface normals.

18. The apparatus of claim 17, wherein the one or more computers are programmed in such a way that the computation of the second depth map is also based on a minimum spanning tree of the graph.

19. The apparatus of claim 14, wherein the one or more computers are programmed to calculate degree of polarization based in part on refractive index of the surface, by performing a computation in which the refractive index is assumed to be a constant that is identical for all surfaces.

20. The apparatus of claim 14, wherein the one or more computers are further programmed to compute zenith angle of a surface normal at a point of the surface in such a way that computed value of the zenith angle depends on degree of polarization at the point.

* * * * *